United States Patent [19]

Hariki et al.

[11] Patent Number: 5,086,262
[45] Date of Patent: Feb. 4, 1992

[54] INDUSTRIAL ROBOT SYSTEM

[75] Inventors: Kazuo Hariki; Tatsuya Koizumi; Kazuya Ishiguro; Kiyoshi Kanitani, all of Toyama, Japan

[73] Assignee: Nachi-Fujikoshi Corp., Toyama, Japan

[21] Appl. No.: 557,071

[22] Filed: Jul. 25, 1990

[30] Foreign Application Priority Data

Jul. 27, 1989 [JP] Japan .................... 1-192648

[51] Int. Cl.⁵ ............................... G05B 11/32
[52] U.S. Cl. .................. 318/568.1; 318/568.11; 318/562; 901/20; 901/21; 395/1
[58] Field of Search ........... 318/41, 562, 564, 568.11, 318/568.12, 568.2, 601, 616, 618; 364/573, 513; 901/3, 9, 12, 20, 21

[56] References Cited

U.S. PATENT DOCUMENTS

| | | |
|---|---|---|
| 3,760,251 | 9/1973 | Posl et al. .................... 318/601 |
| 4,617,498 | 10/1986 | Ruppert .................... 318/41 |
| 4,629,956 | 12/1986 | Nozawa et al. .................... 318/616 |

Primary Examiner—Paul Ip
Attorney, Agent, or Firm—Spencer & Frank

[57] ABSTRACT

An industrial robot system comprising a plurality of robots for conducting a work in cooperation with each other. A system clock is provided in the system, and clocks are provided in the respective robots. These clocks are counted up at the same cycle time, and are set for original points of the respective robots, which are the waiting positions thereof, and the clock values of the robots located in the respective positions during the drive operation. During the drive of the system, the system clock is advanced by adding a predetermined increment value thereto, and the respective robots held under the enabling condition, start the operations by advancing the robot clocks by adding the same increment value as that of the system clock.

7 Claims, 15 Drawing Sheets

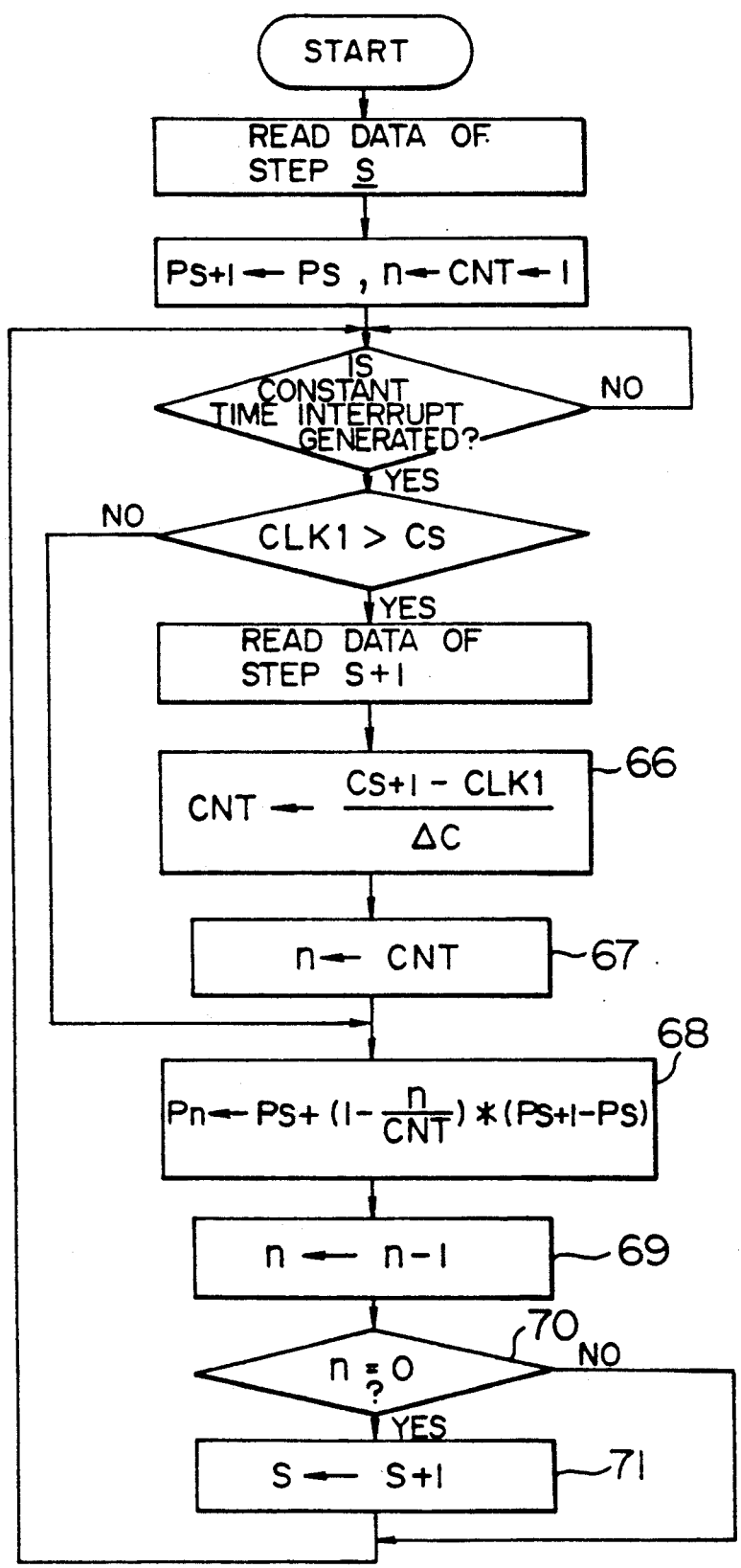

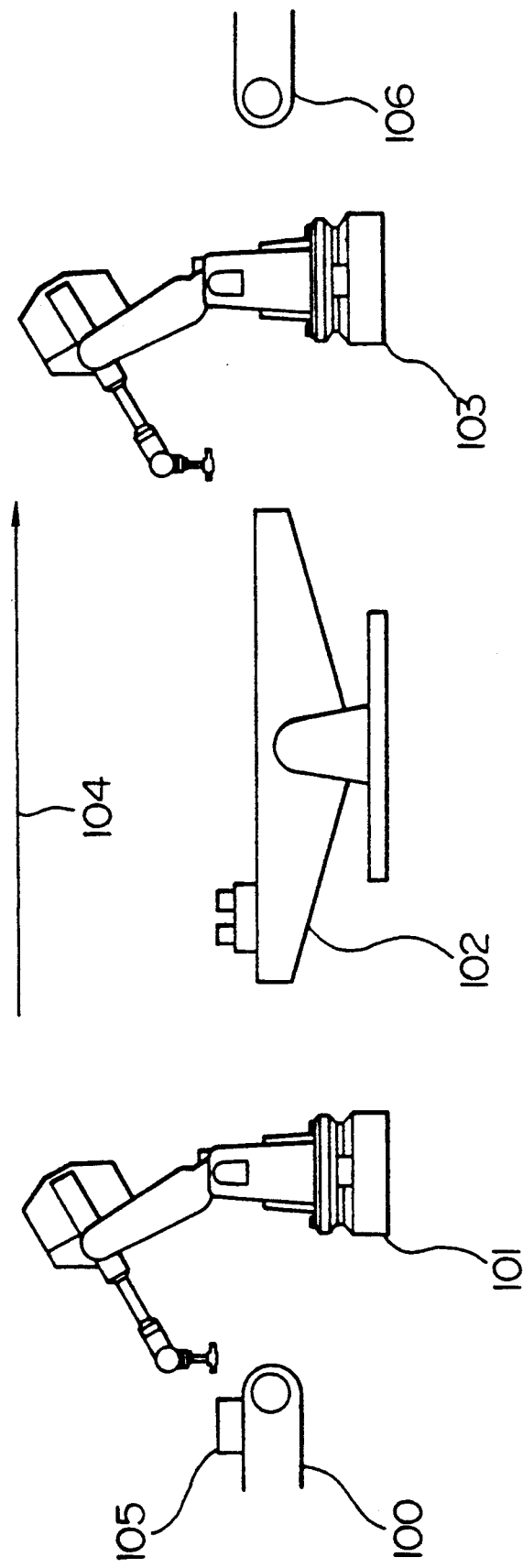

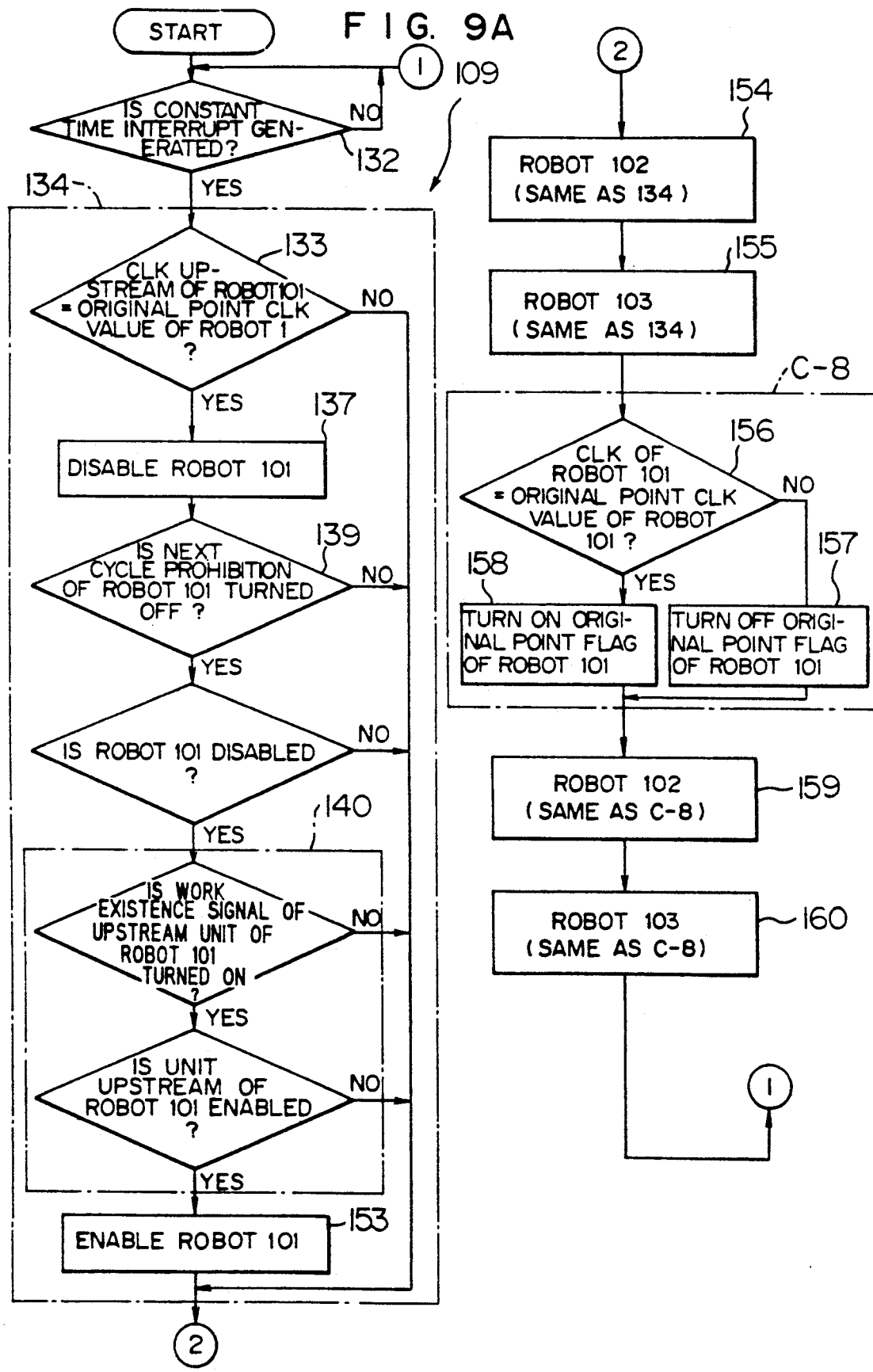

INDUSTRIAL ROBOT SYSTEM

BACKGROUND OF THE INVENTION

The present invention relates to an industrial robot system in which a plurality of robots each having one or more axes are controlled by a single control unit, and all the robots may be simultaneously operated in synchronism with working machines additionally provided in the system.

A conventional industrial robot is composed of a single control unit, a single machine body and a teaching controller for generating commands for teaching. In the case where a work is machined or conveyed by using a plurality of robots, of course, a plurality of control units are to be used. Then, the robots must machine or convey the work in synchronism with mutual interlock signals. For such synchronism, according to the mutual interlock signals, there exists a method for starting of a subject operation robot after it is detected that an associated robot is located at a predetermined position and after it is confirmed that the subject robot does not interfere with the associated robot even if the subject robot is operated.

According to this method, the robot is operated after confirming that the associated robot has stopped a the predetermined position or is not located in the operational area where the subject robot is to be moved. This results in a waste waiting period of time which is longer than necessary for the operation itself. In addition, it is impossible to transfer the work between the robots while the robots are being moved. Namely, when the work is transferred to the associated robot or is received from the associated robot, it is impossible to control the relative moving speed of hands of these robots down to zero. It is therefore necessary to give and take the work under the condition that the respective robots are held in a stationary manner. For this reason, the acceleration and deceleration of the robot bodies are carried out more frequently than necessary, shortens mechanical service life of the robots and leads to wasteful consumption of energy.

Thus, the conventional system composed of the plurality of robots could not effectively be operated.

Also, a conventional robotic program is composed of steps for representing reproduction order of the program, step data for representing physical position of the steps, a time period for movement between the steps, and some input/output signal processing for each step. Accordingly, a movement period between the steps represents a designated time period for the movement between two positions, and this time period differs from the actual movement time. Although the total time for all of the designated time periods of the respective steps should be the cycle time, each step has an error and the error accumulates to generate a large error for the cycle time as a whole. Furthermore, in the conventional positional control method, commanded positional data are designated for a subsequent step after confirming that the robot has reached the commanded position. For this reason, a waiting time is added to the cycle time for every step, and it is impossible to determine the cycle time unless the system is actually in operation. Even if the plurality of robots are controlled by a single control unit, it is impossible to make the cycle times of all the robots the same in accordance with the foregoing positional control method. Accordingly, although single wires are not actually connected to each other, the synchronizing method for the robots within the system is equivalent to the mutual interlock method.

SUMMARY OF THE INVENTION

An object of the invention is to provide an industrial robot system which is capable of continuously operating respective robots and a working machine without any waiting time.

Another object of the invention is to provide a control method for an industrial robot system, according to which respective constituent elements of the system can safely and smoothly operate without waiting times.

Still another object of the invention is to provide a control method for an industrial robot system, which is capable of operating a plurality of robots in synchronism with each other only with a single control unit.

Still another object of the invention is to provide an industrial robotic system which has a high efficiency without any waste time of the system by the application of the above control method according to the invention.

The essential concept of the invention is that a system clock of an industrial robot system and a clock of each robot are set to be counted up at the same cycle time, and that the clock of each robot is advanced by the same increment as that of the system clock during the driving operation of the system. This implies that each instrument or unit of the industrial robot system is controlled with substantially the same clock.

Therefore, by the method defined in appended claims according to one aspect of the invention, a plurality of robots are operated at substantially the same clock and are operated automatically in synchronism with each other without effecting the mutual interlock. Accordingly, it is unnecessary to take a mutual interlock between the plurality of robots unlike the prior art, and there is no case where each robot is kept waiting in accordance with the condition of an associated robot. By eliminating the waiting condition, it is possible to reduce wasted time and energy to a minimum possible level, which could not be attained according to the prior art. Further, since a rapid acceleration/deceleration such as stop-start and start-stop can be reduced, it is possible to prolong a mechanical service life. Thus, more efficient operation of the system can be realized.

With the robot system according to another aspect of the invention, in view of the problems inherent in the conventional robot system, a work may be machined or conveyed without any mutual interlock and without any necessity to stop the operation of respective units of the system. Accordingly, it is possible to realize the robot system of high efficiency from which the systems wasted time has been removed. In order to avoid or eliminate the mutual interlock, according to the invention, a single control unit is used to thereby operate a plurality of robots in synchronism with each other, whereby it is possible to control the position of an associated unit as well as the position of a subject unit within the control unit. In addition, when transferring the work, an external signal such as that from a limit switch or the like may be dispensed with.

Also, according to the invention, formation of the program is modified so as to control the plurality of robots at the same cycle time to thereby completely eliminate the mutual interlock. Thus, an economical robot system is realized.

BRIEF DESCRIPTION OF THE DRAWINGS

In the accompanying drawings:

FIG. 3H is a flowchart of a process o a robot 1 command position calculating section shown in FIG. 2;

FIG. 8A is a schematic view showing an overall structure of an industrial robot system in accordance with another embodiment of the invention;

FIG. 9A is a flowchart of a process of a clock supervising routine for the system shown in FIG. 8A.

DESCRIPTION OF THE PREFERRED EMBODIMENTS

Embodiments of the invention will now be described with reference to the accompanying drawings.

Figure 1:
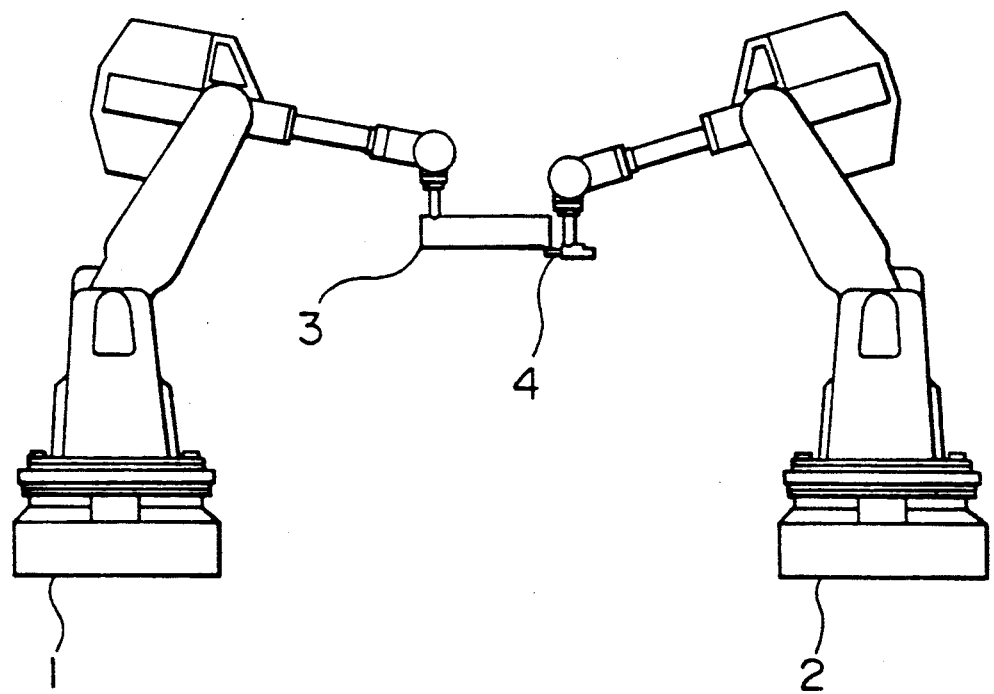
FIG. 1 is a schematic view showing the overall structure of an industrial robot system in accordance with an embodiment of one aspect of the invention.

FIG. 1 shows an industrial robot system in accordance with one embodiment of the invention. The system is illustrated as an example for performing a job for removing burrs of a work 3 by using two robots 1 and 2. In this system, first robot 1 holds the work 3, and second robot 2 removes burrs of work 3 by using a grinder 4. Robots 1 and 2 are respectively taught so that clock signal values of clock signal generating devices correspond to their positions and they perform the burr removal in cooperation with each other in accordance with the increment of the clock signals.

Figure 2:
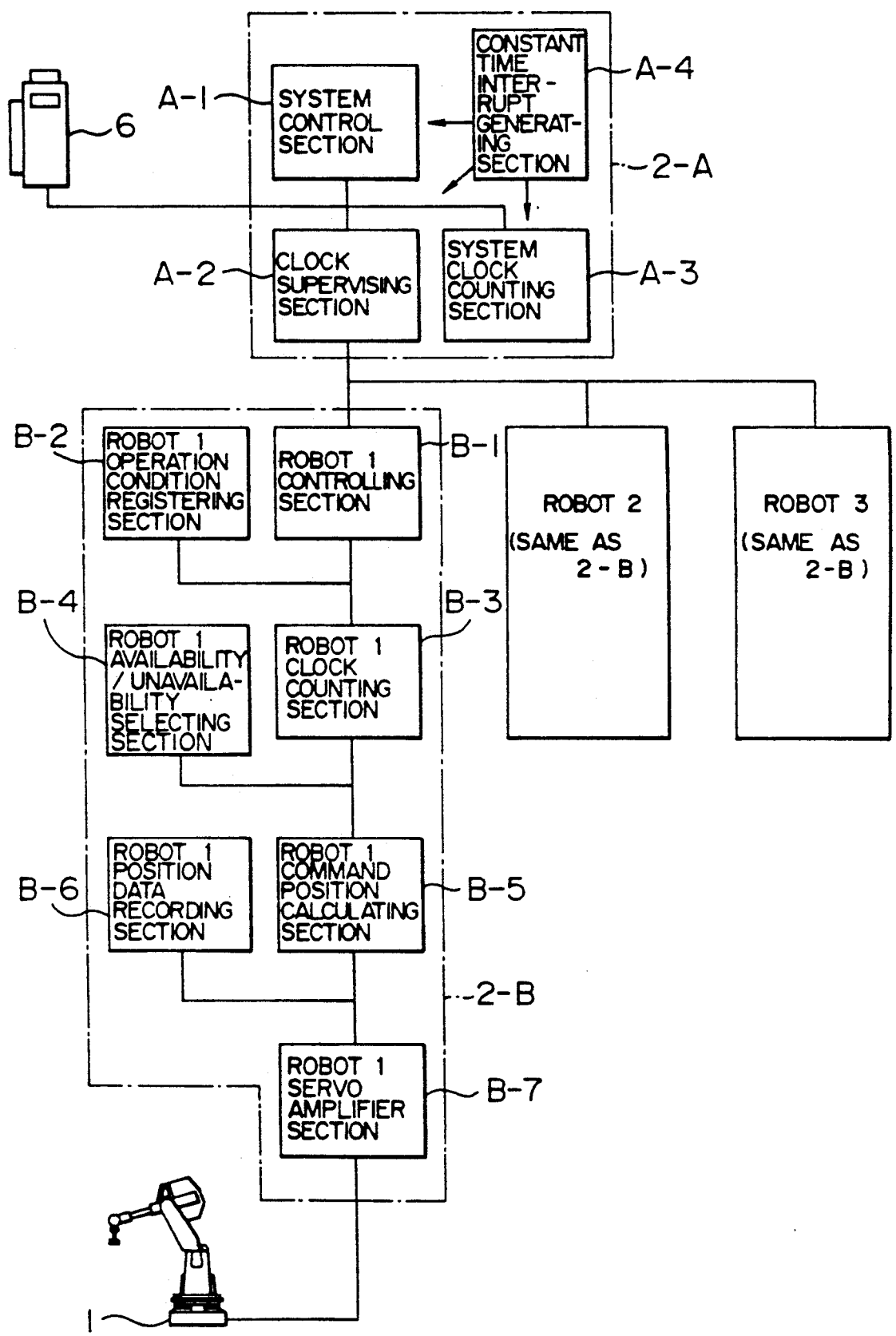
FIG. 2 is a block diagram showing the system shown in FIG. 1.

FIG. 2 shows a structure of the control unit of the above-described robot system. It should be noted that, although FIG. 2 additionally shows a control portion for a third robot, this will be later used for explanation of another example. FIGS. 3A through 3H are flowcharts respectively showing the control flow of the control unit shown in FIG. 2. Each of robots 1 and 2 may be a conventional robot provided with articulations of one or more axes, and hence the detailed explanation of the structure and operation of each robot will be omitted. The synchronous control of the two robots will hereinafter be described.

Incidentally, herein, respective robots 1, 2 are set under the conditions shown in Table 1 below. Robot 1 is referred to as an upstream unit i.e., master unit, and robot 2 is referred to as a downstream unit. Furthermore, as is well known in the art, each clock signal is repeatedly generated at regular intervals to be counted up. This counting is performed from zero up to a certain number of clock signals, and is repeated after reaching this certain number of clock signals. The increment value corresponds to the number of clock signals increasing and increases at every regular time period. The saturated value corresponds to the certain number of clock signals at which the counting renews.

TABLE 1

| | ORIGINAL POINT CLOCK VALUE | (Settings of Unit Operation) | | | |
| --- | --- | --- | --- | --- | --- |
| | | UPSTREAM UNIT | DOWNSTREAM UNIT | UPSTREAM CLOCK | UNIT NOS. |
| ROBOT 1 | 500 | (WORK SUPPLY UNIT) | ROBOT 2 | SYSTEM CLOCK | 1 |
| ROBOT 2 | 1000 | ROBOT 1 | — | ROBOT 1 CLOCK | 2 |

(saturated = 4000)

A section 2-A in FIG. 2 is composed of a system control section A-1, a clock supervising section A-2, a system clock counting section A-3, and a constant time interrupt generating section A-4.

Figure 3A:
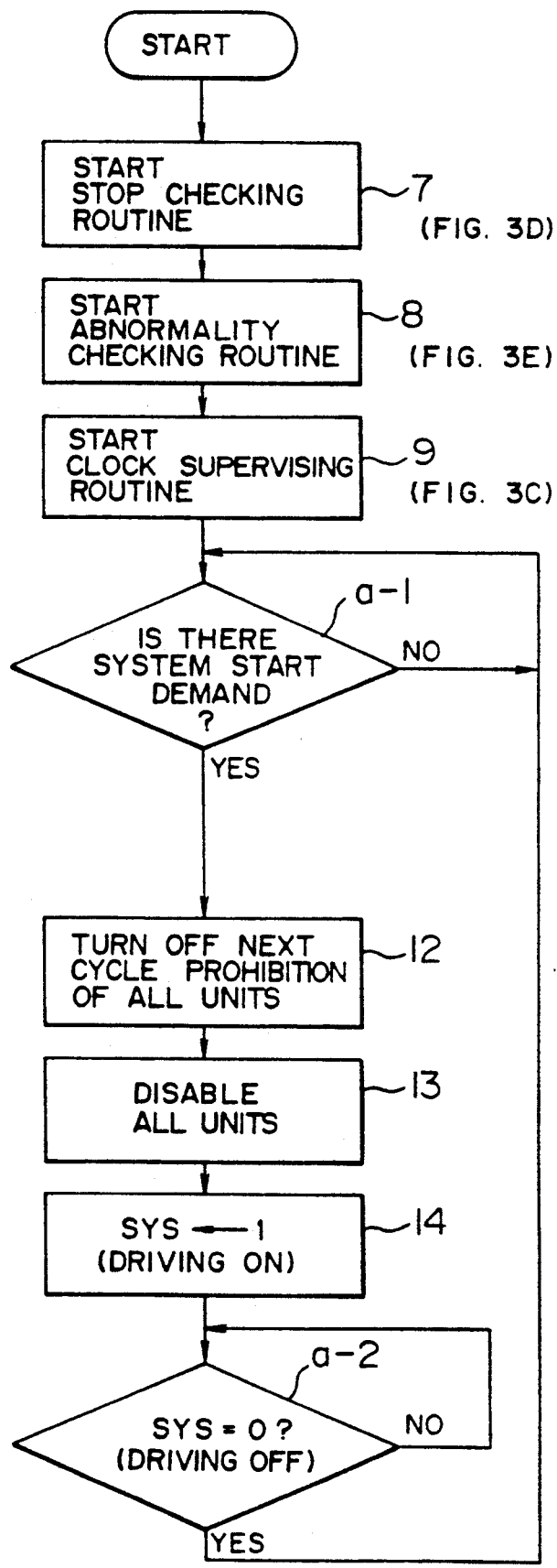
FIG. 3A is a flowchart of a process of a system control section shown in FIG. 2.

Operation of system control section A-1 is carried out in accordance with the flowchart shown in FIG. 3A. System control section A-1 drives or starts stop checking routine 7, an abnormality checking routine 8 and a clock supervising routine 9 after its own start. Then, the respective routines 7, 8 and 9 repeat their processings whenever an interrupt is generated from the constant time interrupt generating section A-4. Subsequently, system control section A-1 checks in step a-1 whether or not there is a start demand for the system. If the start is demanded, system control section A-1 turns off a next cycle prohibition of all the units (i.e., robots 1 and 2) in step 12; and further disables all the units (operation stopping condition) in step 13. Subsequently, a system driving flag (SYS) is set to "1" (driving ON) in step 14, thus completing the process for the start demand. After that, until the flag SYS is ¢0" (driving OFF), the process is looped in block a-2. At the time when the flag SYS is "0", the process is again in the start demand waiting mode in step a-1.

Figure 3B:
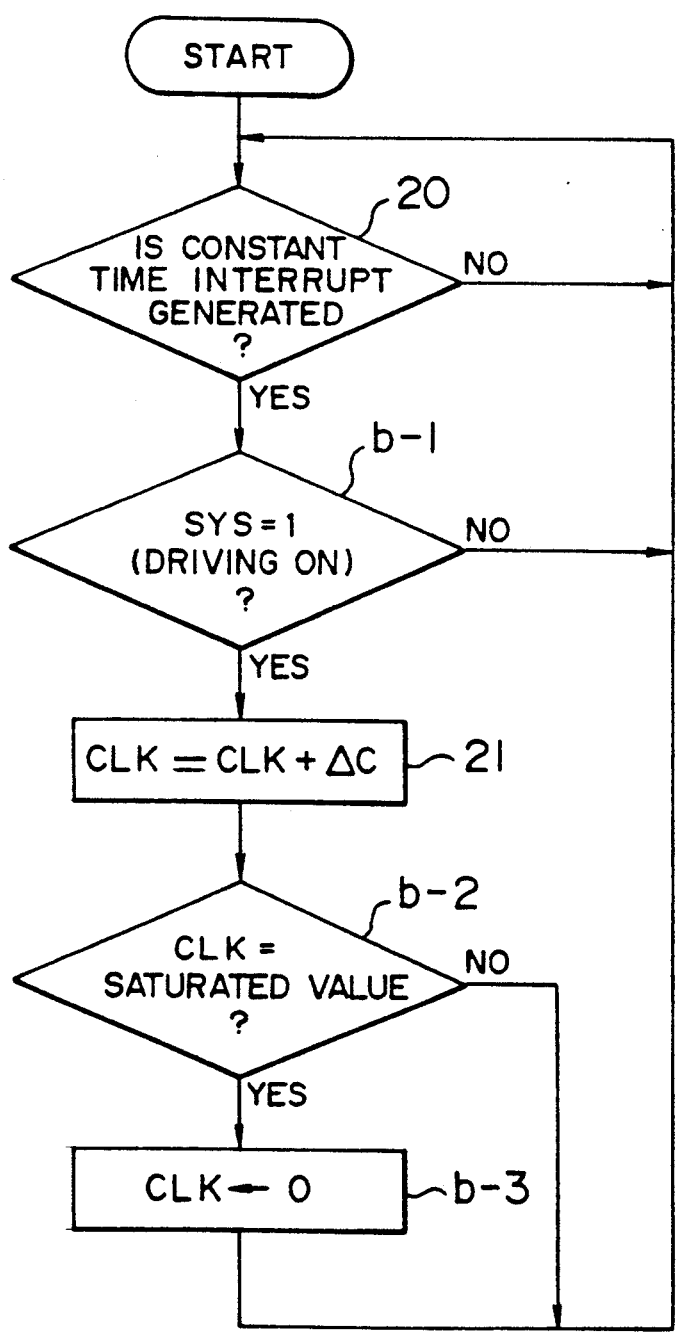
FIG. 3B is a flowchart of a process of a system clock counting section shown in FIG. 2.

Operation of the system clock counting section A-3 shown in FIG. 2 is carried out in accordance with the flowchart show in in FIG. 3B. System system clock counting section A-3 also repeats this process whenever an interrupt is generated from the constant time interrupt generating section A-4. Clock counting section A-3 checks whether the constant time interrupt is generated or not (step 20), and whether the system is driven or not (step b-1). If the system is in "driving ON", a system clock signal (CLK) is increased by an increment value $\Delta C$ in step 21, and is again returned to zero in steps b-2 and b-3 when the signal has reached the saturated value. The increment value $\Delta C$ is determined by the formula: $\Delta C = A = ST/CYT$ where ST is the constant interrupt generation cycle, CYT is a cycle time of the system and A is the saturation value of each clock signal.

Figure 3C:
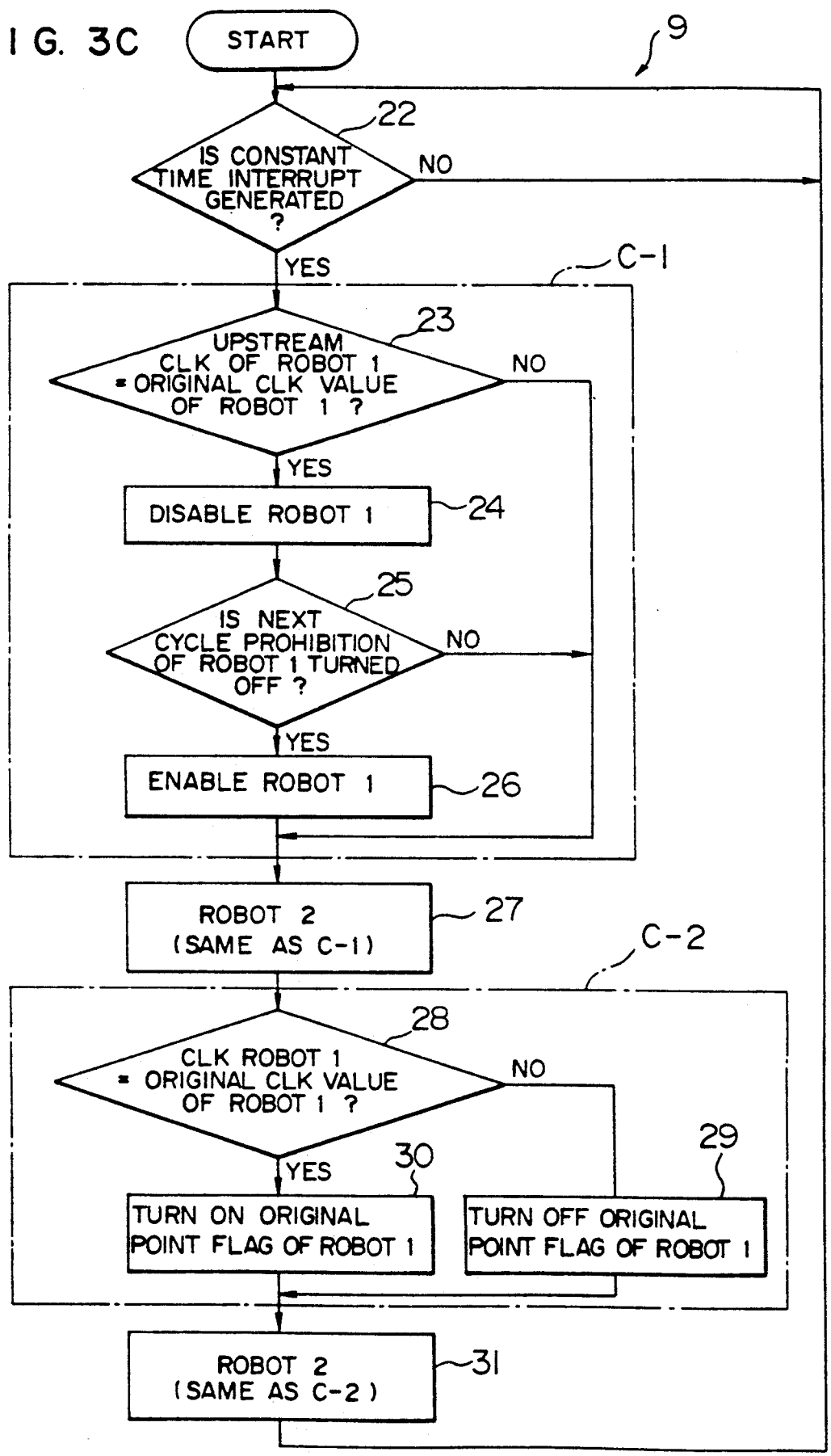
FIG. 3C is a flowchart of a process of a clock supervising routine shown in FIG. 3A.
Figure 3D:
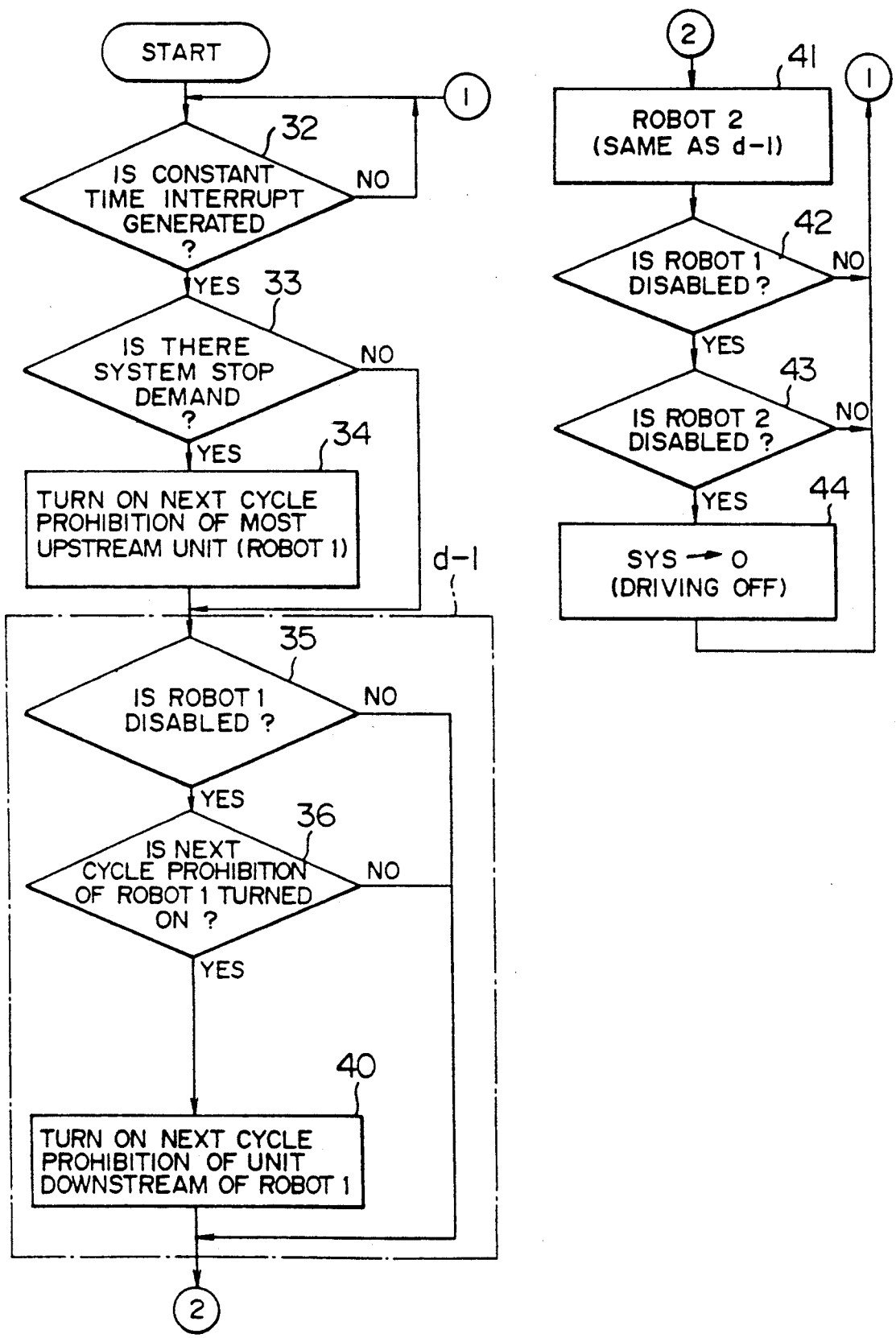
FIG. 3D is a flowchart of a process of a stop checking routine shown in FIG. 3A.

Subsequently, the foregoing clock supervising routine 9 (FIG. 3A) will be explained. Clock supervising routine 9 is carried out in accordance with the flowchart shown in FIG. 3C. The process is carried out whenever the constant time interrupt is generated in step 22. A part c-1 in FIG. 3C represents a processing part for enabling first robot 1 (in the operative condition). First of all, it is checked whether or not the signal value of the clock unit (system clock unit) upstream from robot 1 is identical to the original point clock value of robot 1 in step 23. If not, the process is ended. Namely, robot 1 is not enabled.

If the signal is identical to the original point clock value, robot 1 is once disabled under no condition (step 24). Subsequently, robot 1 checks whether or not the next cycle prohibition is turned off (step 25). If it is turned off robot 1 is enabled (step 26). Robot 2 is also processed in the same manner as in process section c-1 (step 27).

Thus, at the time when signals of the clock units upstream from the respective robots coincide with the original point clock values of the robot units, the respective robots may be enabled and the robots from the upstream side to the downstream side may be synchronized with each other. Subsequently, clock supervising routine 9 checks, in the process part c-2 of FIG. 3C, whether or not the signal of the clock unit of robot 1 is identical to the original point clock value of robot 1 (step 28) and sets the original point flag which indicates whether robot 1 is at the original point or not (steps 29 and 30). The process similar to the process part c-2 of FIG. 3C is effected on second robot 2 (step 31). The above described routine clock supervising routine 9.

Subsequently, stop checking routine 7 shown in FIG. 3A will be explained. Stop check routine 7 is carried out in accordance with the flowchart shown in FIG. 3D. The process is performed whenever the constant time interrupt is generated (step 32). Stop checking routine 7 checks the presence/absence of the system stop demand first of all (step 33). If there is the demand, the next cycle prohibition of the most upstream unit (corresponding to robot 1 of the present system) is turned on (step 34). Subsequently, in a process part d-1 of FIG. 3D, if robot 1 is disabled, the next cycle prohibition is turned on for the unit downstream of robot 1 as the process for transmitting the stop of robot 1 to the unit downstream from robot 1. In the system, if robot 1 is disabled and the next cycle prohibition of robot 1 is turned on, the next cycle prohibition of the unit downstream from robot 1 is turned on. Subsequently, the process similar to the process part d-1 is applied to robot 2 (step 41). Subsequently, stop checking routine 7 checks whether or not all the units are disabled (steps 42 and 43). If disabled, the drive flag (SYS) is set to "0" (driving OFF), thus terminating the process (step 44). This is checking routine 7.

Figure 3E:
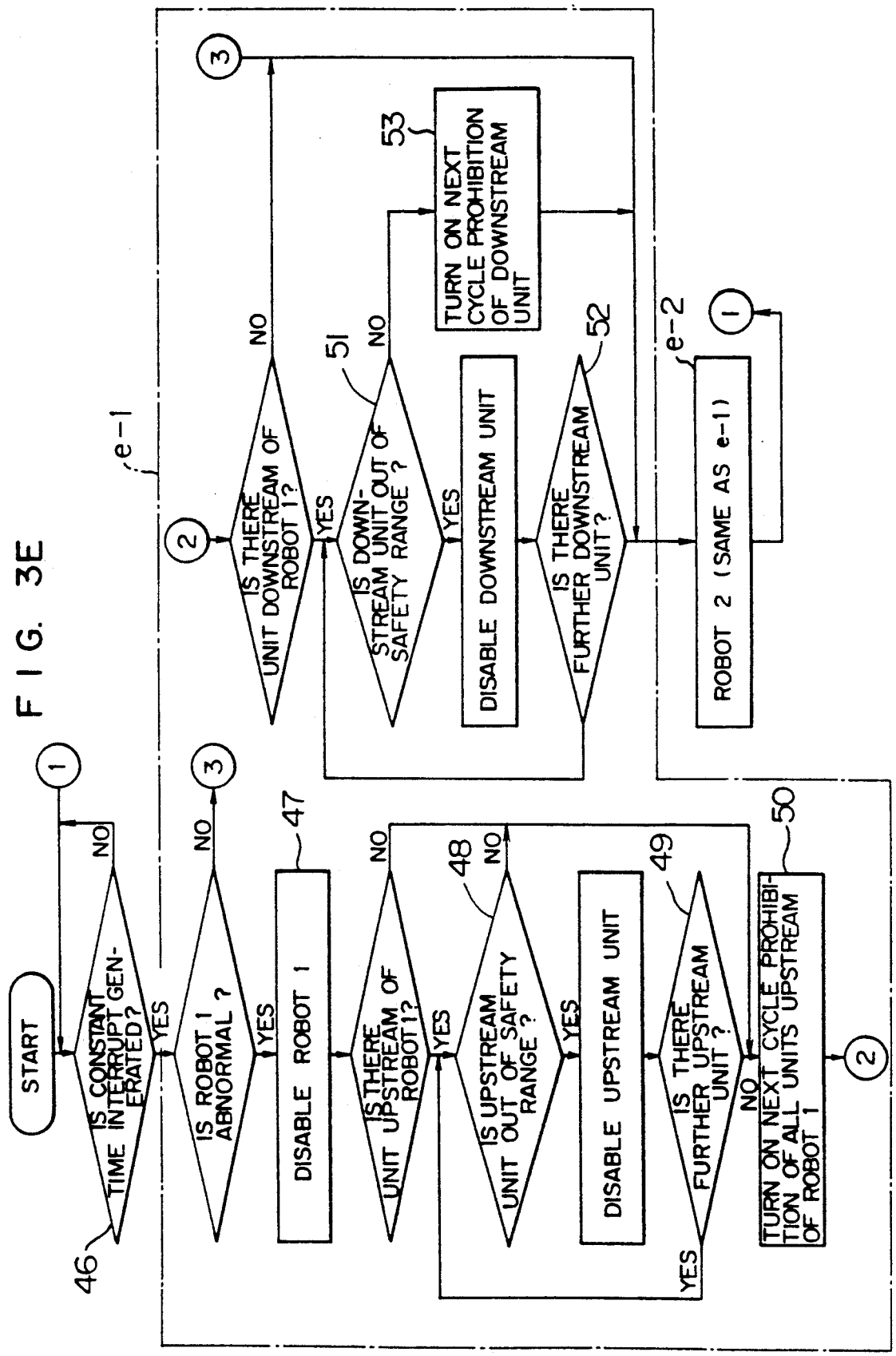
FIG. 3E is a flowchart of a process of an abnormality checking routine shown in FIG. 3A.

Abnormality checking routine 8 shown in FIG. 3A will be now explained. Abnormality checking routine 8 is carried out in accordance with the flowchart shown in FIG. 3E. The process is performed whenever the constant time interrupt is generated (step 46). A part e-1 of FIG. 3E represents the abnormality processing part of robot 1. First of all, the absence/presence of the abnormality of robot 1 is checked. If there is the abnormality, robot 1 is disabled (the operation is prohibited and the robot is stopped as it is) (step 47). Subsequently, if there is the upstream unit, it is checked whether or not upstream robot is kept in a safety operational range (step 48). If the unit is out of the safety operational range, the upstream unit is disabled and stopped. The safety operational range referred to above means a range of positions of each unit, in which if the upstream or downstream unit is stopped due to the abnormality, and even if the robot continues the operation, there is no fear that the robot would interfere with the upstream or downstream stopped unit. The safety operational range is taught in advance within the range of the corresponding clock signal values. For this reason, even if the stop command due to the abnormality of the upstream or downstream unit is effected, if the clock signal of the robot is in the range of the safety operational range, the robot continues its operation, so that the present operational cycle may be continued up to the original point. If the clock signal is out of the safety range, the robot is stopped as it is. Thus, since each unit continues its operation and stops at the original point thereof, in as far as there is no risk of interference, it is possible to avoid the unnecessary stop on the spot and to obviate the job for returning the unit to the original point due to the midway stop. According to the above described means, each unit is judged whether it is to stop on the spot or continue operating.

Subsequently, abnormality checking routine 8 checks whether or not there is any further upstream unit (step 49). If there is an upstream unit, the process is returned back to step 48, and the same process is carried out again. If there is no upstream unit, the next cycle prohibition is turned on for all the upstream units (step 50). Thus, if the abnormality occurs in robot 1, the abnormality is transmitted to the units upstream from robot 1, one after another so that each unit is stopped on the spot or is disabled and stopped at its original point by the next cycle prohibition.

Subsequently, abnormality checking routine 8 checks whether or nor there is any unit downstream from robot 1. If there is a downstream unit, the routine 8 checks whether or not the downstream unit is in its safety operational range (step 51). If the unit is out of the safety operational range, the downstream unit is disabled to be stopped at its present position. Furthermore, the routine 8 checks whether or not there is any further downstream unit (step 52). If any, the same process is carried out in step 51. If the unit is in its safety operational range in step 51, the next cycle prohibition of the downstream unit is turned on, thus terminating the process. With such a routine, if the abnormality occurs in robot 1, the abnormality is transmitted to the further downstream unit. If each unit is out of its safety operational range, the unit is stopped at its present site. If not, the operation thereof is continued up to its original point with the next cycle prohibition turned on. Since the next cycle prohibition is transmitted to the further downstream units by the process part d-1 of the stop checking routine, the downstream units are stopped one after another at the respective original points.

The above described is the abnormality processing on robot 1. Processing part e-2 is applied to robot 2. This is the same as processing part e-1 but the abnormality checking routine.

The block 2-B of robot 1 shown in FIG. 2 will be explained. The block 2-B of robot 1 is composed of a robot 1 control section B-1, a robot 1 operational condition registering section B-2, a robot 1 clock counting section B-3, a robot 1 availability/unavailability selecting section B-4, a robot 1 command position calculating section B-5, a robot 1 position date recording section B-6, and a robot 1 servo amplifying section B-7.

The process of each section will be explained.

Figure 3F:
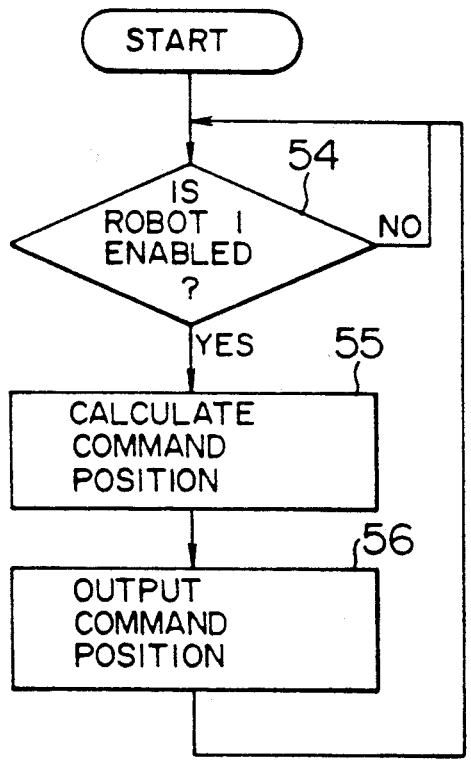
FIG. 3F is a flowchart of a process of robot 1 controlling section shown in FIG. 2.
Figure 3G:
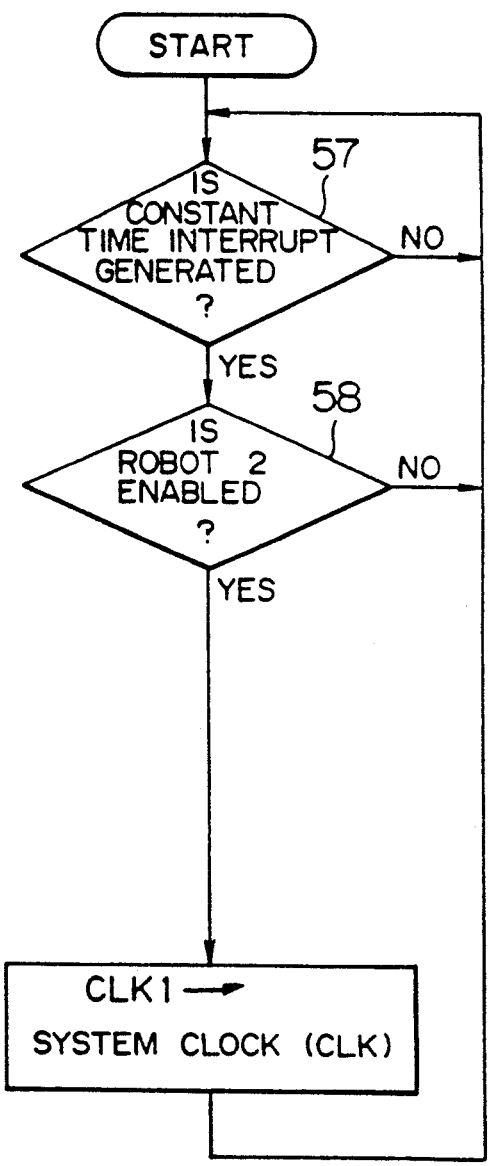
FIG. 3G is a flowchart of a process of a robot 1 clock counting section shown in FIG. 2.

First of all, the process of robot 1 controlling section B-1 is carried out in accordance with the flowchart shown in FIGS. 3F. In this section, it is checked whether or not robot 1 is enabled (step 54). When robot 1 is enabled, the following steps are effected. If robot 1 is enabled, the command position of robot 1 is calculated in accordance with the present value of the clock signal of robot 1 (step 55). The command position signal is outputted to servo amplifying section B-7 of robot 1 (step 56). Robot 1 controlling section B-1 has been described as to its operational routine.

Subsequently, the operational condition registering section B-2 will be explained. In this section, a variety of conditions such as the clock value of the original point of robot 1 and conditions needed for the operation of the upstream and downstream units as listed in Table 1 are registered by the operation of teaching controller 6.

Subsequently, operation of the robot 1 clock counting section B-3 will be described. The process of the robot 1 clock counting section is carried out in accordance with the flowchart shown in FIG. 3G. It is checked (step 58) whether robot 1 is enabled or not whenever the constant time interrupt is generated (step 57). Only when robot 1 is enabled, a value of a system clock signal (CLK) is set to the robot 1 clock unit (CLK1) without any modification. A similar process is performed in each of the other units. When all the units are enabled to be operative, the clock units of all the units have the same value as that of the system clock signal. In this case, all the units are controlled in accordance with the same clock signal.

Operation of robot 1 availability/unavailability selecting section B-4 will be explained with reference to FIG. 4. In robot 1 availability/unavailability selecting section B-4, the availability (operative) or the unavailability (inoperative) of robot 1 for the start of the operation is selected by maneuvering teaching controller 6 (See FIG. 2).

Figure 4:
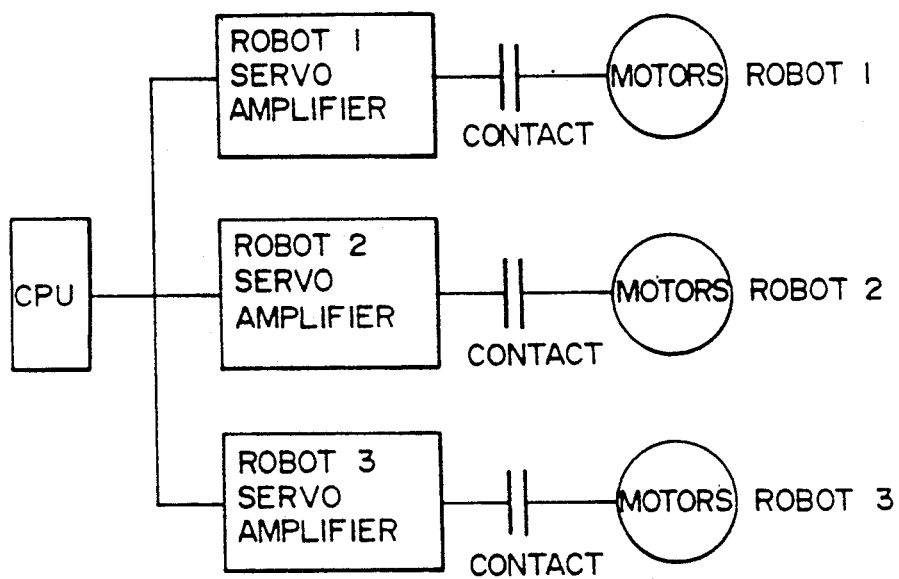
FIG. 4 is a schematic view for illustrating an operation of a robot availability/unavailability selecting section shown in FIG. 2.

By selection of the availability, a contact for the robot selected in FIG. 4 is closed, so that power is supplied from servo amplifier units. In the case of unavailability, since the contact is opened, power will not be supplied. Thus, power is supplied to the robot which has been selected as the available one, so that the robot is in a condition capable of operating or being manually manipulated. On the other hand, if the robot which is selected is the unavailable one, no power is supplied thereto. Accordingly, there is no fear that an accident would occur due to any unexpected or accidental operation of the robot during the operator's maneuver for teaching. Also, since unnecessary power is not supplied to the robot, it is possible to effectively save energy.

The operation of robot 1 command position calculating section B-5 will be explained. In robot 1 command position calculating section B-5, the command position is calculated in accordance with the flowchart of the command value calculating routine shown in FIG. 3H. In this section, the command position corresponding to the present clock value is calculated in accordance with a present value of the clock signal, a clock value of the present step, a position of the robot, a clock value of the next step, and a robot position of the next step. The calculation method will be explained assuming the following parameters:

clock signal increment interval: to t (seconds) ... identical to the constant time interrupt generating cycle clock signal increment value: $\Delta C$ (/unit time or /t seconds)

clock value of the present step S: Cs position of the present step S: Ps clock value of the next step S+1: Cs+1 position of the next step S+1: Ps+1

Also, assuming that the processing time period per one loop of controlling section operational routine B-1 of robot 1 shown in FIG. 3F is within CT seconds at maximum, the definition is made so that the command position calculation may be performed at one time/CT seconds. However, there is a relationship of $t \leq CT$. The following description will be made on the assumption that there is the relationship of $t = CT$ holds, that is, that the clock signal increment interval is equal to the command value calculation interval.

The increment number CNT1 of the clock signal during movement from the present position to the point $P_{s+1}$ is given by the following expression:

$$CNT1 = \frac{C_{s+1} - CLK1}{\Delta C},$$

where CLK1 is the value of the clock signal of robot 1.

The clock signal increment number CNT2 within the command value calculation interval is as follows:

$$CNT2 = \frac{CT}{t} = 1.$$

Therefore, the command value counting number CNT during movement from the present position to the point $P_{s+1}$ is as follows:

$$CNT = \frac{CNT1}{CNT2} = \frac{\frac{C_{s+1} - CLK1}{\Delta C}}{\frac{CT}{t}} = \frac{(C_{s+1} - CLK1) \cdot t}{\Delta C \cdot CT} =$$

$$\frac{C_{s+1} - CLK1}{\Delta C} \text{ (step 66)}.$$

The m-th time command value calculation formula during movement from the present position to the point $P_{s+1}$ is as follows:

$$Pn = Ps + \left(1 - \frac{n}{CNT}\right) \cdot (P_{s+1} - Ps),$$

where n=CNT−m; m=0, 1, 2, ..., CNT.

Figure 5:
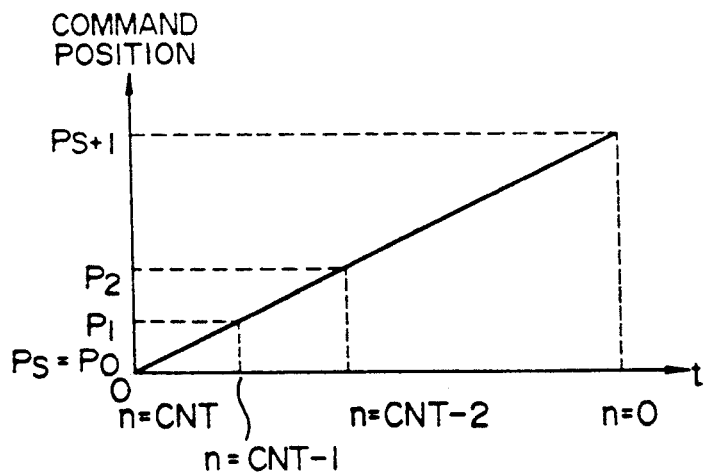
FIG. 5 is a diagram showing a relationship between a command position and a calculation number according to the flowchart shown in FIG. 3H.

In the 0-th calculation of the command value, the calculation is performed under the condition of n=CNT, and in the first calculation, the calculation is performed based upon the value obtained by subtracting "1" from n, i.e., CNT−1. Thereafter, Pn obtained by subtracting "1" from n determining a new Pn and outputting Pn repeatedly as the command value, and the command value reaches $P_{s+1}$ under the condition of n=0. The clock value Cs of the step S+1 and CLK 1 must be identical with each other at n=0. This is the correct synchronized condition between the clock signal and the position. If the value of CLK 1 is advanced beyond Cs+1, the calculation number CNT is decreased to revert the synchronism. In the flowchart shown in FIG. 3H, when the process is started, after the above-described data have been read out, n=CNT is set in step 67, and the command value Pn is calculated and outputted in step 68. Subsequently, n is subtracted by "−1" in step 69, and it is judged whether or not n=0 in step 70. Unless n=0, the process is continued as it is, whereas in the case of n=0, in the step 71, step S+1 is regarded as present step S in order to continue the process. FIG. 5 is a graph illustrating the relationship between the above-described command position and the calculation number.

Figure 6:
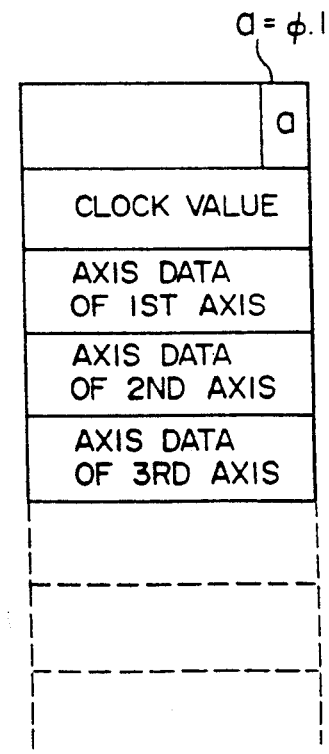
FIG. 6 is a schematic view for illustrating an operation of a robot 1 position data recording section shown in FIG. 2.

Subsequently, the operation of robot 1 position data recording section B-6 will be explained. In this section, positional data of each axis of robot 1 and clock signals corresponding thereto are recorded by maneuvering of teaching controller 6 as shown in FIG. 6. An a-part of FIG. 6 records "0" or "1". The step recorded as "1" means the original point step, and the clock value and the axis data of this step are dealt with as the original point clock value and the original position, respectively. These data are read out whenever the command position calculation is effected in robot 1 command position calculating section B-5.

Subsequently, operation of robot 1 servo amplifier section B-7 will be described. In this section, the command position data calculated in robot 1 command position calculating section B-5 are received and the servo amplifier is driven in accordance with the data, in order to operate the respective motors of robot 1. The respective process contents of robot 1 block 2-B is described above. The same process is also applied to robot 2.

Figure 7:
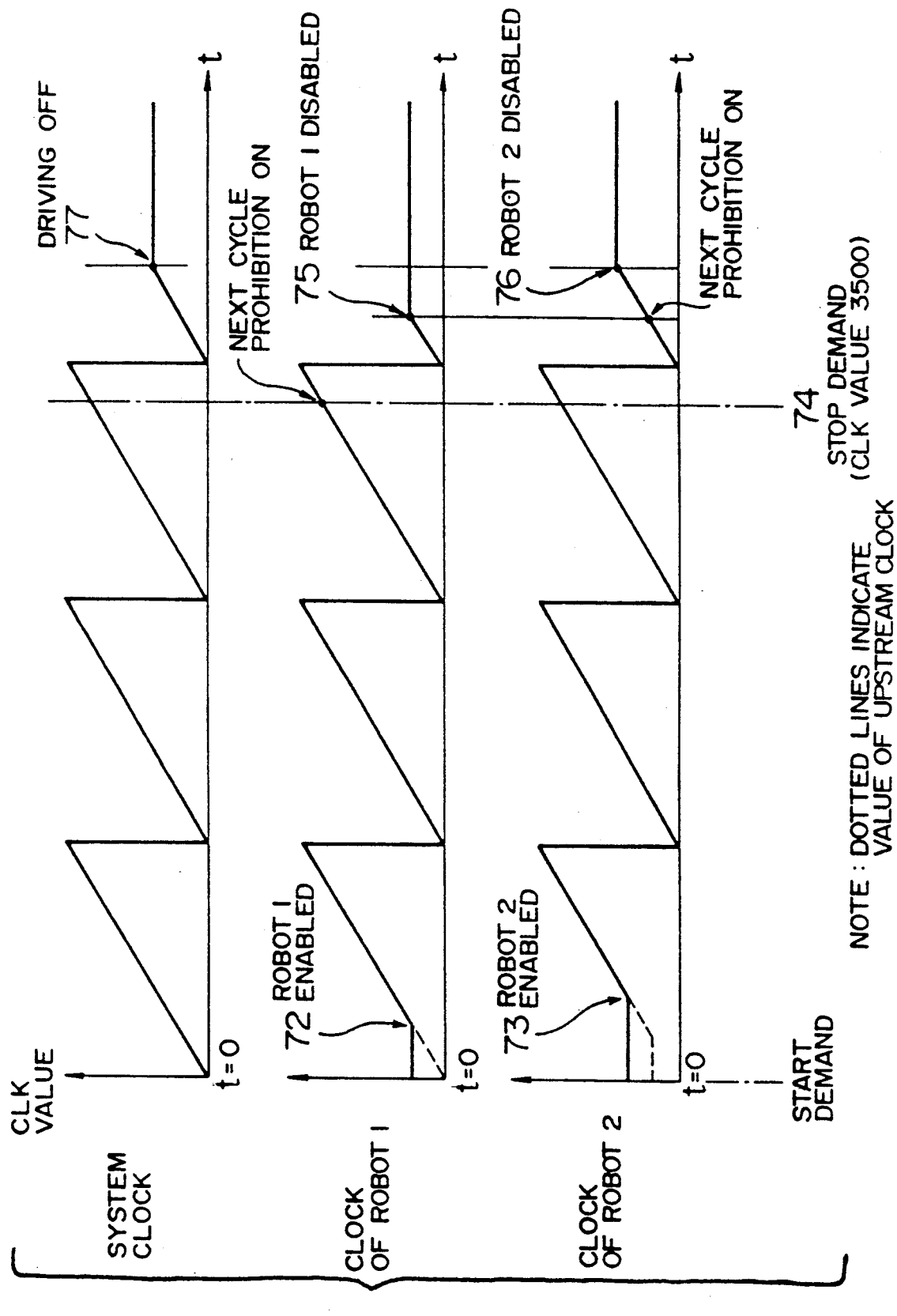
FIG. 7 is a timechart showing a clock cycle of the robot system shown in FIG. 1 when the system is demanded to start and stop.

Subsequently, referring now to FIG. 7, operation, during the start demand and stop demand, of robot system according to the previously described respective sections will now be explained. Herein, it is assumed that the operational conditions shown in Table 1 are set and first and second robots 1 and 2 are located at their respective original points. If there is a start demand at t=0, first of all, the system clock starts counting. When the system clock which is an upstream clock of robot 1 becomes identical to a clock value of the original point of robot 1, robot 1 is enabled (at 72 in FIG. 7) and clock of robot 1 starts counting. Thereafter, when the clock of robot 1 (which is an upstream clock of robot 2) become identical to the original point clock value of robot 2, robot 2 is enabled (at 73 in FIG. 7) and the clock of robot 2 starts counting. Thereafter, when the stop demand is inputted at the clock value of, for example, 3500 (at 74 in FIG. 7), robot 1 is placed under the next cycle prohibition mode. At the time that the clock of robot 1 becomes identical to the next original point clock value of robot 1, robot 1 is disabled (at 75 in FIG. 7). Thus, robot 2 is also subjected to the next cycle prohibition. Then, at the time that the clock of robot 2 becomes identical to the next original point clock value of robot 2, robot 2 is disabled (at 76 in FIG. 7) so as to be in the driving OFF mode at 77 in FIG. 7. Thus, the two robots are enabled by transmission of the clock from the upstream side of the system to the downstream side thereof. Also, robots are operated, even though respective clocks are individual clocks, by substantially the same clock. Thus, even during the burr removing job, the two robots are operated in synchronism with each other to perform an exact job.

Referring to FIG. 8A, there is shown an industrial robot system in accordance with another embodiment of the invention. This system is composed of three robots 101, 102 and 103, and a work 105 supplied from a conveyor 100 is transferred through these robots in a direction 104 up to a downstream conveyor 106.

More specifically, in the system according to this embodiment, work 105 supplied from conveyor 100 is received by first robot 101 and transferred therefrom to second robot 102. Subsequently, work 105 is delivered from second robot 102 to third robot 103 and further from third robot 103 to conveyor 106. Robots 101, 102, 103 are respectively taught so that their positions correspond to clock signals of their respective clocks (not shown), and they operate to hand, receive and transfer work 105 in accordance with increments of respective clock signals. Also in this system, upstream conveyor 100 generates a drive signal (enabling signal) during operation and a work existence signal upon sending work 105, respectively. The respective robots are set, setting the first robot as a master unit, in the operational conditions shown in Table 2. The constitution and operation for control of this system are substantially the same as those of the foregoing embodiment. In particular the control of this embodiment is the same, except for the addition of the third robot. FIG. 2 shows the control block for the third robot. Also, the control process therefor is substantially the same as that shown in FIGS. 3A to 3H. Distinctions between the embodiments will now be explained.

TABLE 2

| | ORIGINAL CLOCK VALUE | SUCTION ON SWITCH VALUE | SUCTION OFF CLOCK VALUE | MACHINING CLOCK VALUE | UP-STREAM UNITS | DOWN-STREAM UNITS | UP-STREAM CLOCK UNITS | WORK TRANSFER METHOD | UNIT NOS. |
|---|---|---|---|---|---|---|---|---|---|
| ROBOT 1 | 1800 | 2000 | 600 | *3300 | CONVEYER | ROBOT 2 | SYSTEM CLOCK | 1 | 1 |
| ROBOT 2 | 2000 | 3500 | 1300 | *400 | ROBOT 1 | ROBOT 3 | ROBOT 1 CLOCK | 1 | 2 |
| ROBOT 3 | 700 | 800 | 3000 | *1900 | ROBOT 2 | *CONVEYER | ROBOT 2 CLOCK | 0 | 3 |

TABLE 2-continued

| ORIGINAL CLOCK VALUE | SUCTION ON SWITCH VALUE | SUCTION OFF CLOCK VALUE | MACHINING CLOCK VALUE | UP-STREAM UNITS | DOWN-STREAM UNITS | UP-STREAM CLOCK UNITS | WORK TRANSFER METHOD | UNIT NOS. |
|---|---|---|---|---|---|---|---|---|
| | | | | | | UNIT | | |

(saturation value = 4000)
Note 1: Mark * represents a unit imaginarily set.
Note 2: The number written in the column of the work transfer method represents the operation as follows.
"0" represents transferring the work to an associated unit under no condition;
"1" represents transferring and receiving the work in synchronism with the associated unit; and
"2" indicates that the work is picked up by the associated unit under no condition.

FIG. 9A shows a clock supervising routine 109 of this system. This corresponds to routine 9 shown in FIG. 3A. Clock supervising routine 109 is carried out in accordance with a flowchart shown in FIG. 9A and conducts a process every time the constant time interrupt is generated. A section 134 in FIG. 9A is a processing section for enabling robot 101. First of all, it is checked whether or not the signal value of a clock unit (system clock unit) upstream from robot 101 is identical to the original point clock value of robot 101 in step 133. If not, the process is completed. Namely, robot 101 is not enabled. On the other hand, if the signal is identical to the original point clock value, robot 101 is once disabled under no condition (in step 137). Subsequently, it is checked whether or not the next cycle prohibition of robot 1 is turned off (in step 39). If it is turned on, robot 101 is not operative and the process is terminated. Thus, it is possible to disable robot 101 at its original point when robot 1 is under the next cycle prohibition. Furthermore, robot 101 is checked as to whether it is disabled or not. If disabled, robot 101 is enabled (step 153) under the condition of processing part 140 that the upstream unit has the machined work and is enabled. Incidentally, although robot 101 is the most upstream unit in this system, work supply unit, i.e., conveyor 106 is regarded as the upstream unit of robot 101. Process block 134 shown in FIG. 9A is similarly applied to second robot 102 and third robot 103 (steps 154, 155). Thus, it is possible to enable the units in accordance with the existence/absence of the upstream work at the time when the signal of the clock unit upstream of each unit is identical to the original point clock value of the unit itself. This results in synchronizing the respective units with each other from the upstream side of the system to the downstream side thereof. Subsequently, the process of block c-8 is carried out. This is similar to block c-2 of FIG. 3C. The process of block c-8 is applied similarly to robots 102 and 103 (steps 159, 160).

Figure 9B:
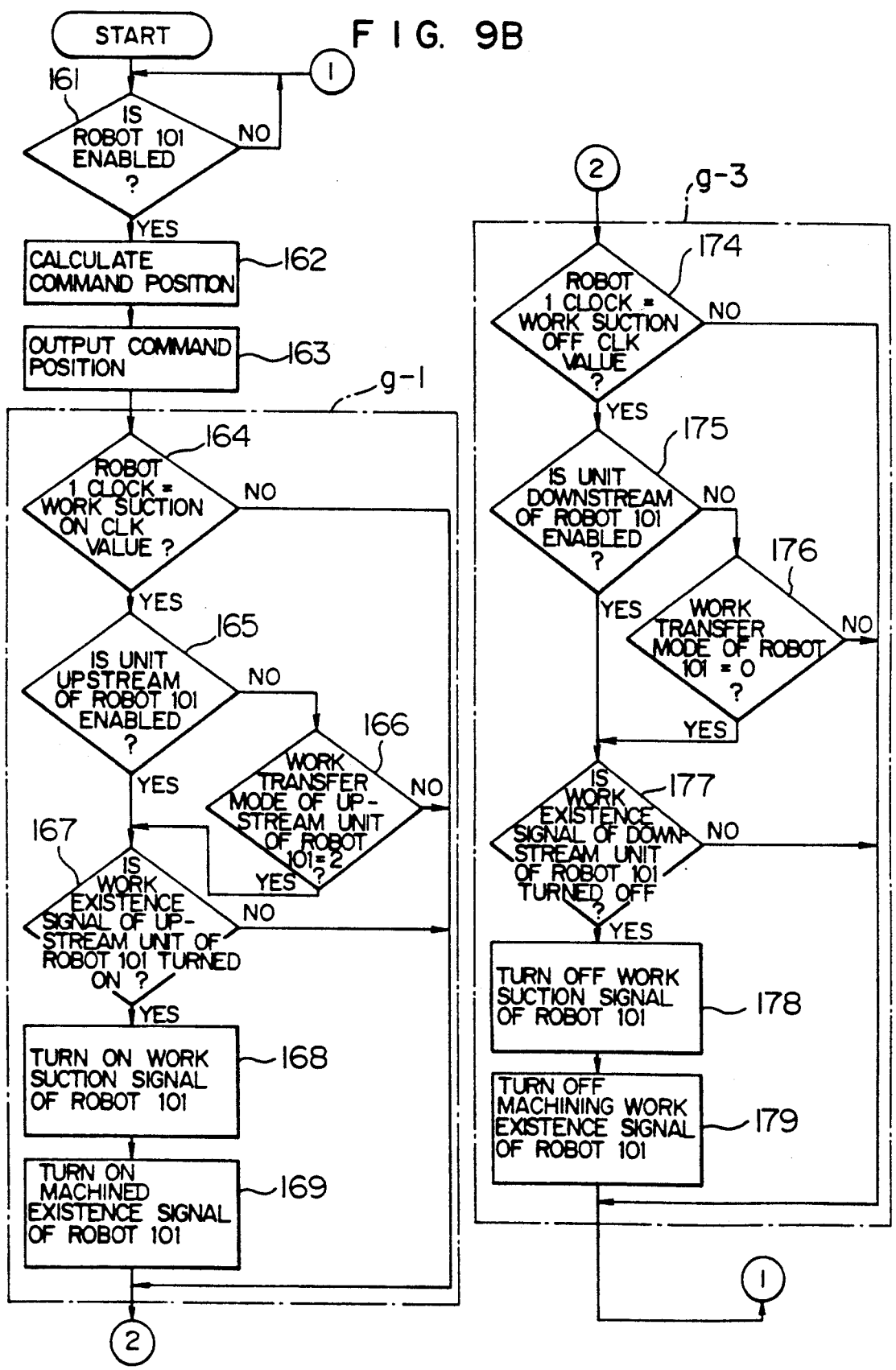
FIG. 9B is a flowchart of a process of a robot 1 controlling section in the system shown in FIG. 8A.

Subsequently, referring now to FIG. 9B, the operational routine of robot 101 will be explained. This corresponds to the process of FIG. 3F. In this routine, it is first checked whether robot 101 is enabled or not (step 161). If enabled, the following process is effected. When robot 101 is enabled, a command position of robot 101 is calculated from a present value of the clock of robot 101 (step 162). The command position is outputted to servo amplifier section B-7 of robot 101 (step 163). Subsequently, in a block g-1 in FIG. 9B, the process for work suction-ON is carried out. In the block g-1, it is checked whether or not the clock of robot 101 is identical to the clock value of work suction-ON (step 164). If identical, it is checked whether the upstream unit, that is, the associated unit from which work is received, is enabled (step 165) and whether the work transfer mode is "2" or not (step 166). In addition, if work is held by the upstream unit, the work suction signal of robot 101 is turned on (step 168), and at the same time, work existence signal of robot is turned on (step 169).

Subsequently in the processing section g-3 of FIG. 9B, the process for turning off work suction of robot 101 is carried out. In this section, it is first checked whether the clock of robot 101 is identical to the clock value of work section-OFF of robot 101 (step 174). If identical, it is checked whether the downstream unit, which is the associated unit to which work is handed, is enabled or not (step 175) and whether work transfer mode of robot is "0" or not (step 176). On the other hand, if work is not present, the suction signal of robot 101 is turned off (step 178), and at the same time, work existence signal of robot 101 is turned off (step 179). The operational routine of robot 101 controlling section has been described. The same routine is similarly applied to robot 102 and 103.

Figure 8B:
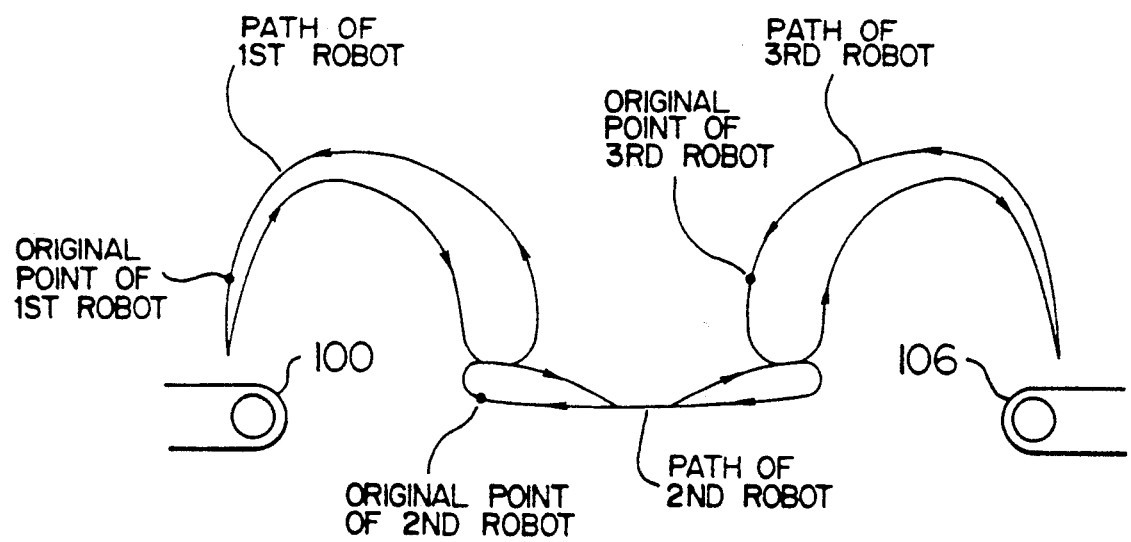
FIG. 8B is a diagram showing operation loci of the respective robots shown in FIG. 8A.

The foregoing is the difference between previously described embodiment and the present embodiment. According to the process described above, it is possible to operate the respective robots in synchronism with each other. Further, it is possible to exactly judge robots to be enabled in accordance with the existence/absence of work on each robot. In addition, in the case where work is transferred between the two robots, since the two robots operate in synchronism, the relative speed may be decreased at zero to thereby smoothly perform the transfer job. The operational loci of robots in the industrial robot system of this embodiment are shown in FIG. 8B.

Although the present invention has been described on the basis of the embodiments, it is to be understood that various modifications can be made to the specific forms 1 and/or the invention may be embodied in other forms within the scope of the appended claims.

What is claimed is:

1. A method for controlling an industrial robot system including a plurality of robots arranged for conducting a job in cooperation with each other, comprising the following steps of:
    a) setting a system clock and a clock for each robot so that a predetermined increment value is added to each clock in every constant basic time period, each clock reaching a predetermined saturated value just within a cycle time of the system, and then each clock again starting to count from zero;
    b) setting, for each of the robots, an original point clock value which is a waiting position for starting an operation, and setting respective positions of each robot during operation of that robot in accordance with clock values of the clock associated with that robot; and
    c) advancing the system clock by adding thereto the predetermined increment value every constant basic time period during drive of the system, and advancing the clock of each robot by adding thereto the predetermined increment value whenever a robot corresponding to that clock is enabled.

2. The method according to claim 1, further comprising the step of:
(d) calculating a position which each robot reaches in every constant basic time period of a recycle operation, by following the steps of:
1) obtaining a difference between a clock value of a present step and a clock value of a next step for each robot;
2) obtaining a calculation number as to what multiple of the predetermined increment value of the clock corresponds to the difference;
3) obtaining an increment value of position by dividing a difference between a target position to be reached and a present position by the calculation number;
4) obtaining a first complementary point by adding the increment value of position to the present position; and
5) successively complementing the present position, calculating the present position synchronously with the clock of the corresponding robot and outputting the calculated position to the corresponding robot for the operation by replacing the calculation number with "1" minus the calibration number and repeatedly obtaining an n-th complementary point from step 3) if "1" minus the calibration number is not zero.

3. The method according to claim 1, further comprising the steps of:
e) setting a safety operational range for each robot, within which, even when a stop command is generated during a recycle operation of the system, operation of the robot is continued, except for an emergency stop, from a present step to an original point step when it is judged that any operational interference and accidental release of a work may not occur; and
f) conducting a predetermined safety stop of the robot which suffers from an abnormality, transferring a stop signal to the other adjacent robots to avoid interference between the robots, determining whether any other robots are to stop or to continue operating until reaching their respective original points by judging whether or not the other robots are in the respective safety operational ranges, and preventing interference between adjacent robots by transmitting the stop command to other robots upstream and downstream from the robot with an abnormality.

4. The method according to claim 1, further comprising the step of:
g) setting availability/unavailability signals for controlling a supply of power to each robot, and during teaching operation, supplying power only to a robot to be taught.

5. The method according to claim 1, further comprising the steps of:
h) controlling information on a work, said controlling step including:
1) setting a work delivery association number representing which of the robots receives the work from a subject robot;
2) setting a transfer mode number defining a method of handling the work to an associated robot by releasing the work form the subject robot and picking up the work of the associated robot from the subject robot; and
3) obtaining data of work conditions representing whether the work is machined or not, whereby judging a condition of the work and a next process concerning the work at any time; and
j) synchronizing the clock of each robot and the system clock by, in the case where an associated robot holds the work during drive of the system, enabling the robot when the system clock reaches the original clock value of the robot, to start operating.

6. An industrial robot system comprising:
a plurality of robots each having at least one axis, arranged for performing a job in cooperation with each other;
a teaching controller for moving the robots to conduct teaching thereof and assigning a recordation of positions of the robots; and
a single robot controlling unit, said robot controlling unit comprising:
a) a system clock and a clock for each robot, a predetermined increment value being added to each clock every constant basic time period, each clock reaching a predetermined saturated value within a cycle time of the system and then each clock starting to count again from zero;
b) program forming means for correspondingly recording values of the clock of each robot in accordance with positions of the corresponding robot;
c) means for registering an original point of each robot corresponding to the clock thereof, by setting the original point which corresponds to a waiting position of the robot for starting operation and selecting any step of a program as the original point;
d) means for advancing the system clock during drive of the system by adding thereto a predetermined increment value every basic time period, and advancing the clock of each robot by adding thereto the predetermined increment value when the robot associated with that clock is enabled;
e) means for setting a safety operational range for each robot within which operation of the robot is continued except for an emergency stop, in the case where it is judged that, if continuing the operation up to the original point of the robot after a present step, even when a stop command is generated during a recycle operation of the system, any operational interference and an accidental release of work may not occur;
f) abnormality transferring means for conducting a predetermined safety stop of the robot which suffers from an abnormality, transferring a stop signal to the other adjacent robots to avoid interference between the robots, determining whether any other robots are to stop or to continue operating until reaching the respective original points by judging whether or not the other robots are in the respective safety operational ranges, and preventing interference between adjacent robots by transmitting the stop command to the other robots upstream and downstream from the robot having the abnormality;
g) means for setting availability/unavailability signals for controlling a supply of power to each robot, and during teaching operation, supplying power only to a robot to be taught; and h) controlling means for controlling information on the work, said controlling means comprising:
 1) means for obtaining a difference between a clock value of a present step and a clock value of a next step;
 2) means for obtaining a calculation number as to what multiple of the predetermined increment of the clocks corresponds to the difference;
 3) means for obtaining an increment value of position by dividing the difference between a target position to be reached and a present position by the calculation number;
 4) means for obtaining a first complementary point by adding the increment value of position to the present position; and
 5) means for successively complementing the position, calculating the position synchronous with the clock and outputting the calculated position to the robot for operation by subtracting "1" from the calculation number and repeatedly obtaining an n-th complementary point from 3) if the subtracted number is not zero.

7. An apparatus according to claim 6, further comprising:
 j) means for controlling information of the work, said controlling means including:
  1) means for setting a work delivery association number representing a robot which receives the work from the subject robot;
  2) means for setting a transfer mode number defining one of a method of handing the work to the associated robot by releasing the work from the subject robot and a method of picking up the work by the associated robot from the subject robot; and
  3) means for obtaining data of work conditions representing whether the work is machined or not, whereby judging a condition of the work and a next process concerning the work at an time; and
 j) means for synchronizing the clock of each robot and the system clock by, in the cane where the associated robot holds the work during drive of the system, enabling the robot at the time when the system clock reaches the original clock value of the robot to start operating.

* * * * *